US012639531B2

(12) United States Patent　　　　(10) Patent No.:　US 12,639,531 B2

Russell　　　　　　　　　　　　　　　(45) Date of Patent:　　May 26, 2026

---

(54) SYSTEM AND METHOD FOR INCREASING THE ACCURACY OF TEXT SUMMARIZATION

(71) Applicant: Bank of America Corporation, Charlotte, NC (US)

(72) Inventor: Jennifer Russell, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 157 days.

(21) Appl. No.: 18/590,105

(22) Filed: Feb. 28, 2024

(65) Prior Publication Data

US 2025/0272508 A1　　　Aug. 28, 2025

(51) Int. Cl.
G06F 40/40　　　　　(2020.01)
(52) U.S. Cl.
CPC .................................... G06F 40/40 (2020.01)
(58) Field of Classification Search
None
See application file for complete search history.

(56) References Cited

U.S. PATENT DOCUMENTS

| | | | |
|---|---|---|---|
| 8,181,021 B2 | 5/2012 | Ginter et al. | |
| 9,098,142 B2 | 8/2015 | Westerman et al. | |
| 10,023,117 B2 | 7/2018 | Ricci | |
| 10,290,320 B2 | 5/2019 | Hu et al. | |
| 10,455,297 B1 | 10/2019 | Mahyar et al. | |
| 10,685,050 B2 | 6/2020 | Krishna et al. | |
| 10,691,901 B2 * | 6/2020 | Kumar ...................... G06N 3/08 | |
| 10,909,313 B2 | 2/2021 | Can et al. | |
| 10,911,840 B2 | 2/2021 | Goel et al. | |
| 11,029,838 B2 | 6/2021 | LeMay et al. | |
| 11,494,658 B2 | 11/2022 | Chen et al. | |
| 11,500,917 B2 | 11/2022 | Wu | |
| 12,153,896 B2 * | 11/2024 | Dymetman .............. G06N 7/01 | |
| 2021/0374349 A1 | 12/2021 | Liu et al. | |
| 2022/0129636 A1 * | 4/2022 | Baughman ........... G06Q 20/145 | |
| 2022/0254338 A1 | 8/2022 | Gruber et al. | |

(Continued)

OTHER PUBLICATIONS

Chaudhury et al. "X-Factor: A Cross-metric Evaluation of Factual Correctness in Abstractive Summarization". Proceedings of the 2022 Conference on Empirical Methods in Natural Language Processing, pp. 7100-7110 Dec. 7-11, 2022 (Year: 2022).*

(Continued)

*Primary Examiner* — Jesse S Pullias

(57)　　　　　　ABSTRACT

A system for increasing the accuracy in summarization techniques is disclosed. The system generates a set of summaries for text. The system determines a label for each summary based on a set of composite metrics. The label for the summary indicates the truthfulness and faithfulness of the summary with respect to the text. The system determines that more than a threshold number of the set of composite metrics indicate that a first summary is assigned with a first label. In response, the system adds the first summary paired with the text as a positive sample to a dataset. The system determines that more than a threshold number of composite metrics indicate that a second summary is assigned with a second label. In response, the system adds the second summary paired with the text as a negative sample to the dataset. The system trains a summarization algorithm with the dataset.

20 Claims, 3 Drawing Sheets

(56) References Cited

U.S. PATENT DOCUMENTS

| 2023/0065155 A1* | 3/2023 | Goyal | G06N 7/01 |
| 2023/0069113 A1* | 3/2023 | Tsuchida | G06F 16/345 |
| 2023/0376677 A1* | 11/2023 | Choubey | G06N 3/09 |

OTHER PUBLICATIONS

Wong et al. "Extractive Summarization Using Supervised and Semi-supervised Learning" Proceedings of the 22nd International Conference on Computational Linguistics (Coling 2008), pp. 985-992 Manchester, Aug. 2008. (Year: 2008).*

Shuyang Cao and Lu Wang. 2021. CLIFF: Contrastive learning for improving faithfulness and factuality in abstractive summarization. In Proceedings of the 2021 Conference on Empirical Methods in Natural Language Processing, pp. 6633-6649, Online and Punta Cana, Dominican Republic. Association for Computational Linguistics.

Tanya Goyal and Greg Durrett. 2021. Annotating and modeling fine-grained factuality in summarization. In Proceedings of the 2021 Conference of the North American Chapter of the Association for Computational Linguistics: Human Language Technologies, pp. 1449-1462, Online. Association for Computational Linguistics.

Beliz Gunel, Jingfei Du, Alexis Conneau, and Veselin Stoyanov. 2021. Supervised contrastive learning for pre-trained language model fine-tuning. In International Conference on Learning Representations.

Wojciech Kryscinski, Bryan McCann, Caiming Xiong, and Richard Socher. 2020. Evaluating the factual consistency of abstractive text summarization. In Proceedings of the 2020 Conference on Empirical Methods in Natural Language Processing (EMNLP), pp. 9332-9346, Online. Association for Computational Linguistics.

Yixin Liu and Pengfei Liu. 2021. SimCLS: A simple framework for contrastive learning of abstractive summarization. In Proceedings of the 59th Annual Meeting of the Association for Computational Linguistics and the 11th International Joint Conference on Natural Language Processing (vol. 2: Short Papers), pp. 1065-1072.

Scialom, Thomas, et al. "Questeval: Summarization asks for fact-based evaluation." arXiv preprint arXiv:2103.12693 (2021).

David Wan, Mengwen Liu, Kathleen McKeown, Markus Dreyer, and Mohit Bansal. 2023. Faithfulness-Aware Decoding Strategies for Abstractive Summarization. In Proceedings of the 17th Conference of the European Chapter of the Association for Computational Linguistics.

* cited by examiner

300 —

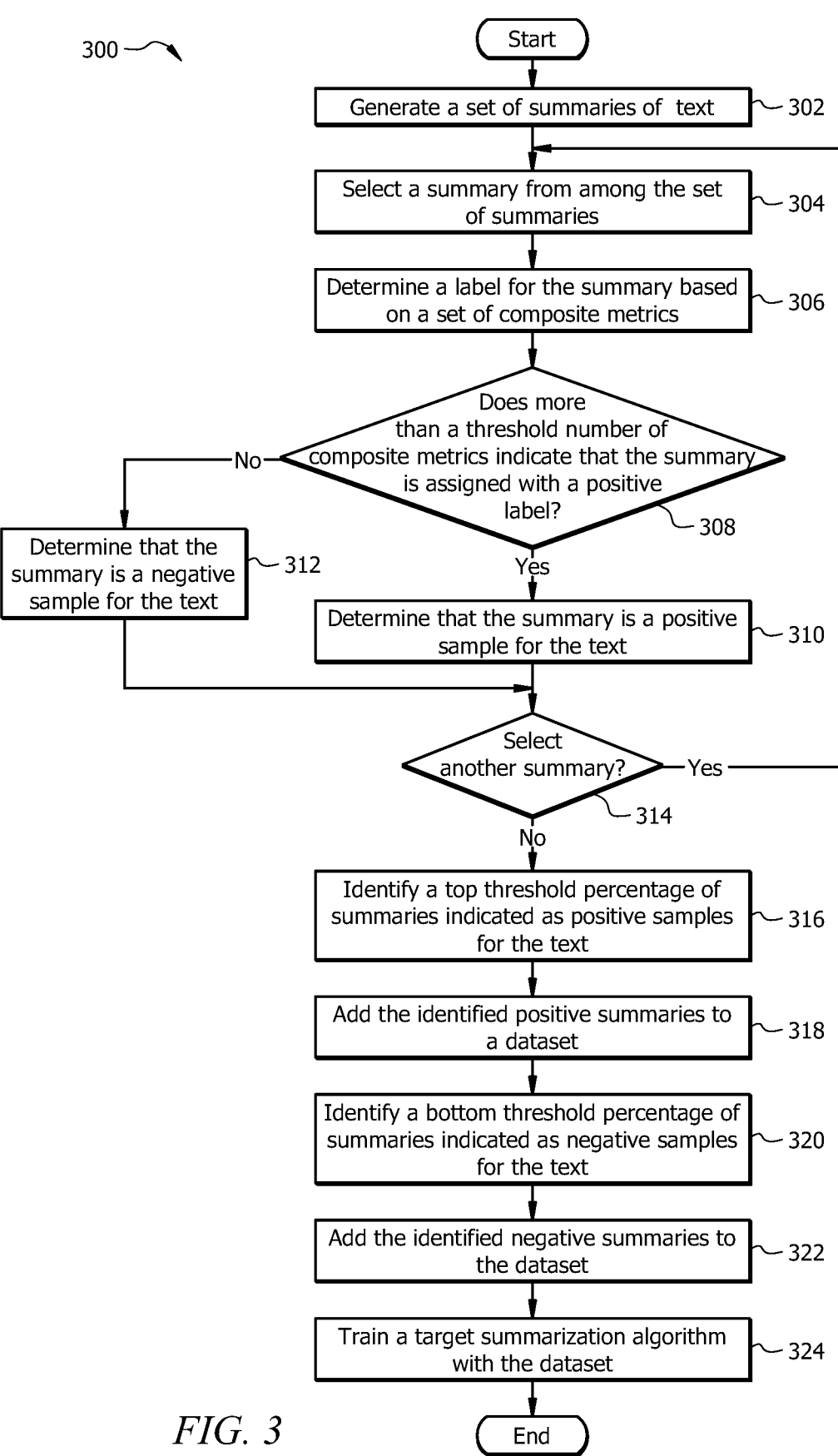

Start

Generate a set of summaries of text — 302

Select a summary from among the set of summaries — 304

Determine a label for the summary based on a set of composite metrics — 306

Does more than a threshold number of composite metrics indicate that the summary is assigned with a positive label? — 308

No

Determine that the summary is a negative sample for the text — 312

Yes

Determine that the summary is a positive sample for the text — 310

Select another summary? — 314

Yes

No

Identify a top threshold percentage of summaries indicated as positive samples for the text — 316

Add the identified positive summaries to a dataset — 318

Identify a bottom threshold percentage of summaries indicated as negative samples for the text — 320

Add the identified negative summaries to the dataset — 322

Train a target summarization algorithm with the dataset — 324

End

*FIG. 3*

SYSTEM AND METHOD FOR INCREASING THE ACCURACY OF TEXT SUMMARIZATION

TECHNICAL FIELD

The present disclosure relates generally to text processing and generation, and more specifically to a system and method for increasing the accuracy of text summarization.

BACKGROUND

Users use summarization algorithms to generate summaries from text. The summarization algorithms generate summaries that may not be faithful and truthful with respect to a given text. For example, a summary may include irrelevant and/or incorrect information with respect to the given text.

SUMMARY

The system described in the present disclosure is particularly integrated into practical applications of improving the quality and accuracy (including truthfulness and faithfulness) in text summarization techniques and the functioning of computer systems that are tasked with generating summaries from text. This approach provides technical advantages and improvements such as reduced computing and network resources for text summarization processes.

Current text summarization systems generate a summary from a given text, however, the generated summary may not be factual/truthful and/or faithful with respect to the given text. For example, in some cases, a generated summary may include incorrect and/or non-factual sentences. In another example, a generated summary may include information that is irrelevant to the original text; thus, it may not be faithful to the original text. Such problems may be due to several factors, including a biased training dataset, where the training dataset includes biases, inaccuracies, etc. Another example of such factors may include overreliance on keyword searches in the text which may cause relevant information to be overlooked if it is noted in less frequent keywords in the text.

The disclosed system provides a technical solution to these and other technical problems. In some embodiments, the disclosed system provides a mechanism to evaluate the quality and accuracy of a generated summary based on a set of composite metrics. For example, in operation, the disclosed system may generate a set of summaries from a given text and evaluate each summary according to a set of composite metrics. Each of the composite metrics is configured to score or label the summary in terms of quality (e.g., such as truthfulness and faithfulness with respect to the original text). In some embodiments, the disclosed system may use the consensus (e.g., an indication of positive summaries from more than a threshold number) of the set of composite metrics to identify one or more summaries that are assigned with a positive label. Similarly, the disclosed system may identify one or more summaries that are assigned with a negative label. The positive label may indicate that a summary is accurate (e.g., truthful, and faithful) with respect to the original text. The negative label may indicate that a summary is inaccurate (e.g., not truthful, and/or not faithful) with respect to the original text.

In some embodiments, the disclosed system may determine whether more than a threshold number of the composite metrics have assigned a positive label to a summary. In some embodiments, the disclosed system may determine whether more than a threshold number of the composite metrics have assigned a negative label to a summary.

The disclosed system may identify a top threshold percentage (e.g., top 10%, 20%, etc.) of the summaries that are assigned with a positive label and a bottom threshold percentage (e.g., bottom 10%, 20%, etc.) of the summaries that are assigned with a negative label. The disclosed system may use the identified top high-quality summaries as positive samples for the text, and the bottom identified low-quality summaries as negative samples for the text. The disclosed system may use contrastive learning to enlarge the gap between the high-quality (truthful and faithful) summaries and low-quality (untruthful or unfaithful) summaries for future summarization tasks by any summarization algorithm.

In this manner, the disclosed system improves the quality of text summarization techniques to achieve more accurate and reliable summaries. This is accomplished by the objective of using contrastive learning to learn from the examples of high-quality summaries while avoiding generating summaries similar to low-quality summaries.

In some embodiments, by using the disclosed system, the amount of processing and memory resources typically needed to generate summaries are reduced. For example, the disclosed system utilizes a subset of all generated summaries, where the subset of the summaries includes the top number of high-quality summaries and the bottom number of low-quality summaries as a more focused training dataset, instead of using all the generated summaries which does not provide a focused set of positive and negative examples. Thus, the summarization algorithms may be trained with the more focused training dataset in which the gap between the class of approved high-quality summaries and the class of disapproved low-quality summaries is enlarged, which leads to an improved classification of summaries and easier identification of positive summary samples to follow and negative summary samples to avoid. This, further, leads to reduced computational complexity in the summary generation process. For example, as the summarization algorithm becomes more adept at distinguishing between high-quality and low-quality summaries, it requires fewer iterations and less processing, memory, and time to generate a summary that meets the desired quality standards. In this manner, the system 100 improves the text summarization techniques and the functioning of computer systems tasked with generating summaries from text.

In some embodiments, a system for increasing the accuracy in summarization techniques comprises a memory operably coupled to a processor. The memory is configured to store a file comprising a first text, wherein the first text comprises one or more lines of text. The processor is configured to generate a set of summaries for the first text, wherein each summary from the set of summaries is associated with a respective summarization style. The processor is further configured to determine a label of each summary from the set of summaries based at least in part upon a set of composite metrics, wherein the label of a summary indicates a truthfulness and faithfulness of the summary with respect to the first text. It is determined that the summary of the first text is truthful with respect to the first text in response to determining that the summary comprises facts from the first text. It is determined that the summary of the first text is faithful with respect to the first text in response to determining that context of the summary is consistent with context of the first text. In some embodiments, determining the label of each summary from the set of summaries based at least in part upon the set of composite metrics comprises determining, based at least in part upon a first composite metric from among the set of composite metrics, a first label for a first summary from among the set of summaries; determining, based at least in part upon the first composite metric, the second label for a second summary from among the set of summaries; determining, based at least in part upon a second composite metric from among the set of composite metrics, the first label for the first summary; and determining, based at least in part upon the second composite metric, the second label for the second summary. The processor is further configured to determine that more than a threshold number of the set of composite metrics indicate that at least the first summary is assigned with the first label, wherein the first label indicates that the first summary is truthful and faithful with respect to the first text. The processor is further configured to determine that more than the threshold number of the set of composite metrics indicate that the second summary is assigned with the second label, wherein the second label indicates that the second summary is not truthful and/or faithful with respect to the first text. The processor is further configured to add the first summary paired with the first text to a dataset of text-summary pairs, wherein the first summary is labeled as a positive sample for the first text. The processor is further configured to add the second summary paired with the first text to the dataset of text-summary pairs, wherein the second summary is labeled as a negative sample for the first text. The processor is further configured to train a summarization algorithm with the dataset.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates an example flowchart of a method to improve the quality and accuracy of summarization techniques.

DETAILED DESCRIPTION

Figure 1:
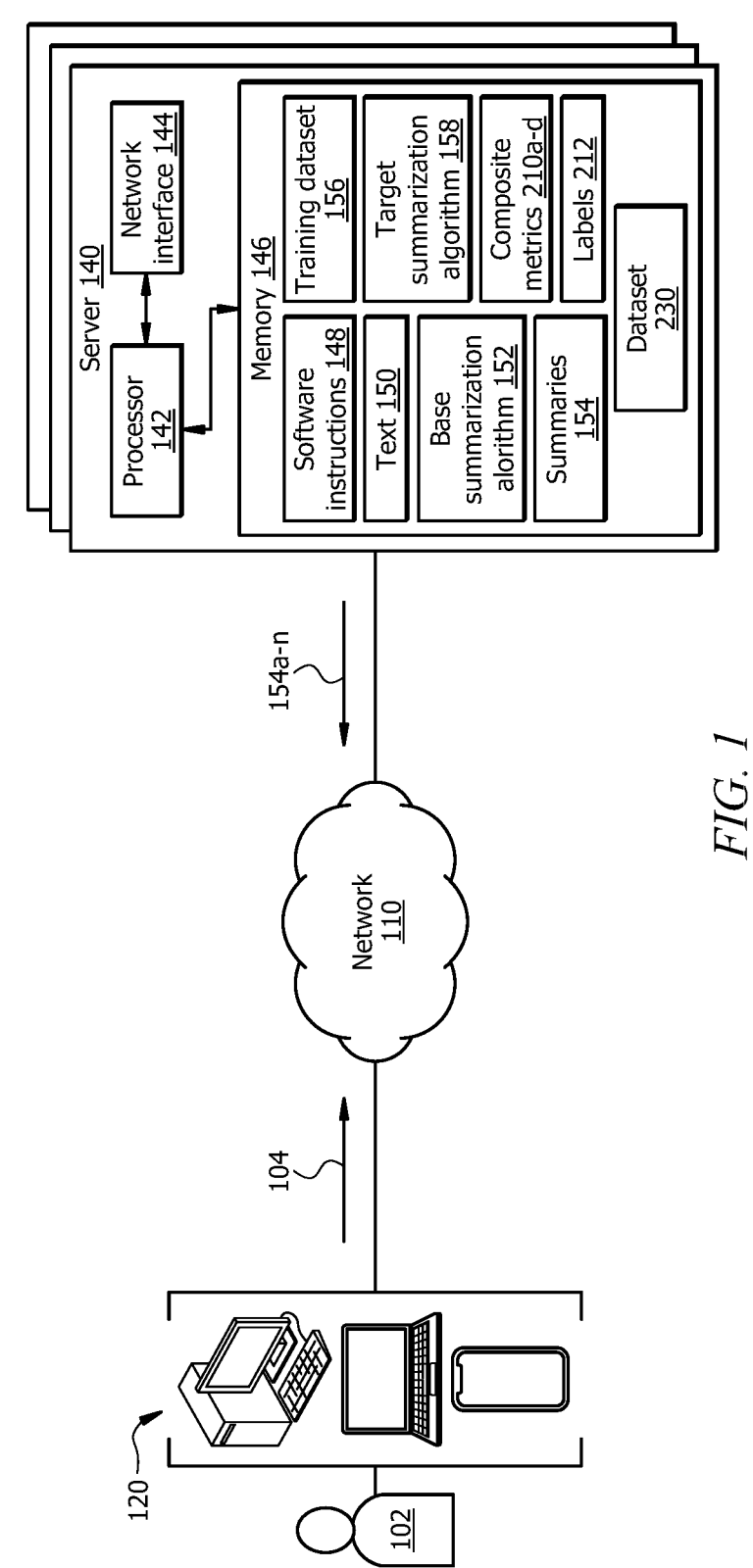
FIG. 1 illustrates an embodiment of a system configured to improve the quality and accuracy of summarization techniques.
Figure 2:
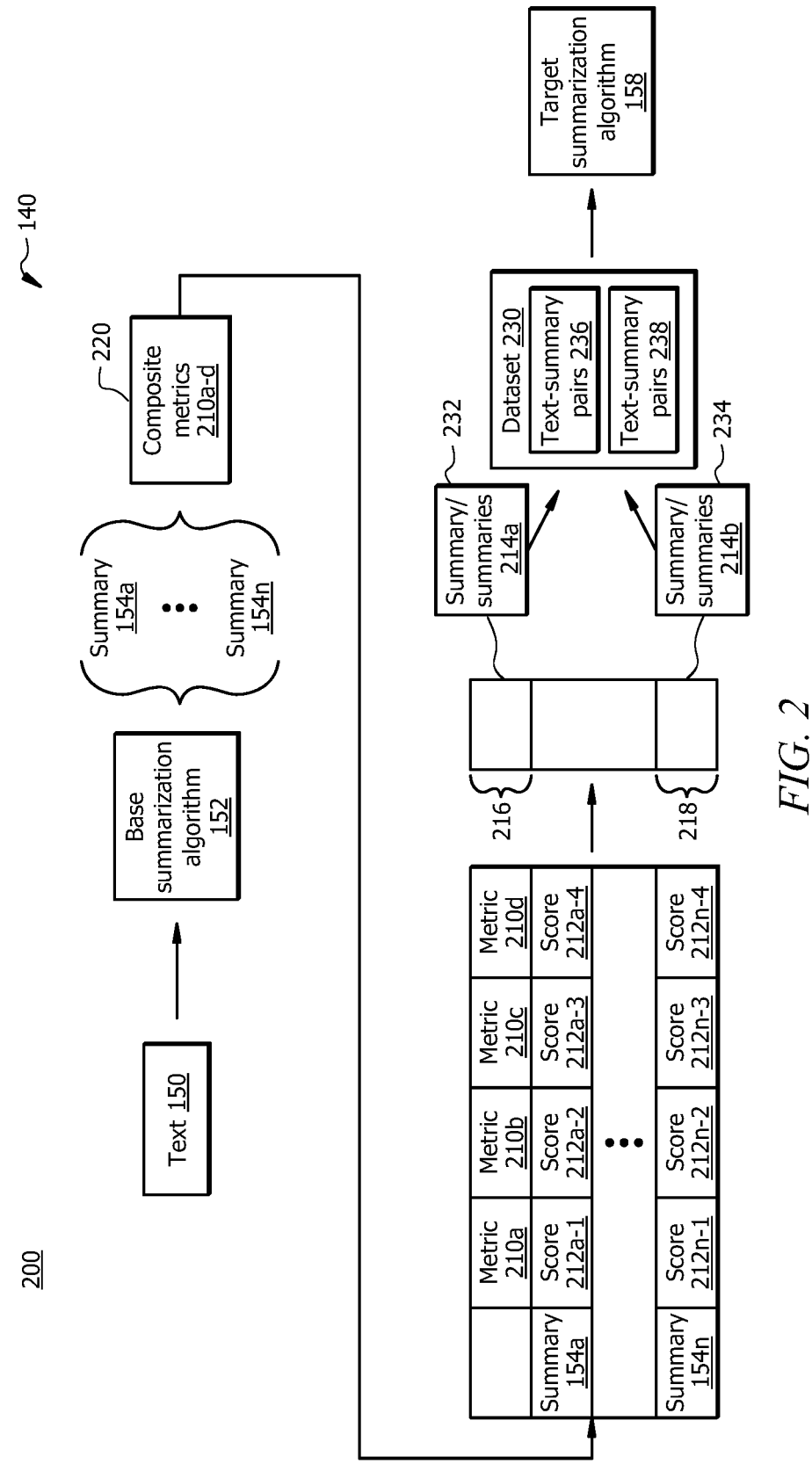
FIG. 2 illustrates an example operational flow of the system of FIG. 1.

As described above, previous technologies fail to provide efficient and reliable solutions to improve the quality and accuracy of summarization techniques. Embodiments of the present disclosure and its advantages may be understood by referring to FIGS. 1 through 3. FIGS. 1 through 3 are used to describe systems and methods to improve the quality and accuracy of summarization techniques, according to some embodiments.

System Overview

FIG. 1 illustrates an embodiment of a system 100 that is generally configured to improve the quality and accuracy (including truthfulness and faithfulness) of text summaries in the text summarization techniques. In some embodiments, the system 100 comprises a server 140 communicatively coupled with one or more computing devices 120 via a network 110. The network 110 enables the communication among the components of the system 100. A user 102 may use the computing device 120 to send a request 104 to generate a summary of text or to generate a plurality of summaries of a plurality of text to the server 140. The server 140 may receive the request 104 and perform certain operations (as described herein) to generate the requested summary/summaries. In other embodiments, system 100 may not have all of the components listed and/or may have other elements instead of, or in addition to, those listed above.

In general, the system 100 improves the quality and accuracy of summarization techniques and the functioning of computer systems that are tasked with performing the text summarization processes. Current text summarization systems generate a summary from a given text, however, the generated summary may not be factual/truthful and/or faithful with respect to the given text. For example, in some cases, a generated summary may include incorrect and/or non-factual sentences. In another example, a generated summary may include information that is irrelevant to the original text, thus, it may not be faithful to the original text. Such problems may be due to several factors, including a biased training dataset, where the training dataset includes biases, inaccuracies, etc. Another example of such factors may include overreliance on keyword searches in the text which may cause relevant information to be overlooked if it is noted in less frequent keywords in the text.

The disclosed system 100 provides a technical solution to these and other technical problems. In some embodiments, the system 100 provides a mechanism to evaluate the quality and accuracy of a generated summary based on a set of composite metrics. For example, in operation, the system 100 may generate a set of summaries from a given text and evaluate each summary according to a set of composite metrics.

Each of the composite metrics is configured to score or label the summary in terms of quality (e.g., such as truthfulness and faithfulness with respect to the original text). In some embodiments, the system 100 may use the consensus (e.g., an indication of positive summaries from more than a threshold number) of the set of composite metrics to identify one or more summaries that are assigned with a positive label and one or more summaries that are assigned with a negative label. The positive label may indicate that a summary is accurate (e.g., truthful, and faithful) with respect to the original text. The negative label may indicate that a summary is inaccurate (e.g., not truthful, and/or not faithful) with respect to the original text.

In some embodiments, the system 100 may determine whether more than a threshold number of the composite metrics have assigned a positive label to a summary. In some embodiments, the system 100 may determine whether more than a threshold number of the composite metrics have assigned a negative label to a summary.

The system 100 may identify a top threshold percentage (e.g., top 10%, 20%, etc.) of the summaries that are assigned with a positive label and a bottom threshold percentage (e.g., bottom 10%, 20%, etc.) of the summaries that are assigned with a negative label. The system 100 may use the identified top high-quality summaries as positive samples for the text, and the bottom identified low-quality summaries as negative samples for the text. The system 100 may use contrastive learning to enlarge the gap between the high-quality (truthful and faithful) summaries and low-quality (untruthful or unfaithful) summaries for future summarization tasks by any summarization algorithm.

In this manner, the system 100 improves the quality of text summarization techniques to achieve more accurate and reliable summaries. This is accomplished by the objective of using contrastive learning to learn from the examples of high-quality summaries while avoiding generating summaries similar to low-quality summaries.

In some embodiments, by using the system 100, the amount of processing and memory resources typically needed to generate summaries are reduced. For example, the system 100 utilizes a subset of all generated summaries, where the subset of the summaries includes the top number of high-quality summaries and the bottom number of low-quality summaries as a more focused training dataset, instead of using all the generated summaries which does not provide a focused set of positive and negative examples. Thus, the summarization algorithms may be trained with the more focused training dataset in which the gap between the class of approved high-quality summaries and the class of disapproved low-quality summaries is enlarged, which leads to an improved classification of summaries and easier identification of positive summary samples to follow and negative summary samples to avoid. This, further, leads to reduced computational complexity in the summary generation process. For example, as the summarization algorithm becomes more adept at distinguishing between high-quality and low-quality summaries, it requires fewer iterations and less processing, memory, and time to generate a summary that meets the desired quality standards. In this manner, the system 100 improves the text summarization techniques and the functioning of computer systems tasked with generating summaries from text.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Example Computing Device

Computing device 120 may be generally any device that is configured to process data and interact with users 102. Examples of the computing device 120 include but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by user 102. The computing device 120 may include a hardware processor, memory, and/or circuitry configured to perform any of the functions or actions of the computing device 120 described herein. For example, the computing device 120 includes a processor in signal communication with a network interface and a memory. The memory of the computing device 120 stores software instructions that when executed by the processor of the computing device 120 cause the processor of the computing device 120 to perform one or more operations of the computing device 120 described herein. For example, a software application designed using software code may be stored in the memory of the computing device 120 and executed by the processor of the computing device 120 to perform the functions of the computing device 120. The computing device 120 is configured to communicate with other devices and components of the system 100 via the network 110.

The computing device 120 may be configured to perform any action described herein. For example, assume that the user 102 wants to generate one or more summaries 154 of one or more pieces of text 150. The user 102 may use the computing device 120 to send a request 104 that indicates to generate the one or more summaries 154 from the one or more pieces of text 150 to the server 140. In response, the server 140 may perform a series of operations to generate the one or more summaries 154. This process is described in great detail in FIG. 2.

Server

Server 140 may include one or more hardware computer systems, such as virtual machines. For example, the server 140 may be implemented by a plurality of computing devices using distributed computing and/or cloud computing systems in a network. In some embodiments, the server 140 may be a server in a server farm. The server 140 may be an instance of one or more servers 140. In certain embodiments, the server 140 may be configured to provide services and resources (e.g., data and/or hardware resources) to the components of the system 100. For example, the server 140 may generate summaries 154 for text 150.

The server 140 comprises a processor 142 operably coupled with a network interface 144 and a memory 146. Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and stores the results of ALU operations. The processor 142 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 148) to perform the operations of the server 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 described in FIG. 2, and one or more operations of the method 300 as described in FIG. 3.

Network interface 144 is configured to enable wired and/or wireless communications. The network interface 144 may be configured to communicate data between the server 140 and other devices, systems, or domains of the system 100. For example, the network interface 144 may comprise a near field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, base summarization algorithm 152, text 150, training dataset 156, dataset 230, summaries 154, target summarization algorithm 158, labels 212 (e.g., labels 212a-1, 212a-2, 212a-3, 212a-4, 212n-1, 212n-2, 212n-3, and 212n-4), composite metrics 210a-d, and/or any other data or instructions. The software instructions 148 may comprise any suitable set of instructions, logic, rules, or code operable to execute the processor 142 and perform the functions described herein, such as some or all of those described in FIGS. 1-3. The text 150 may be or include any type of text. For example, the text 150 may include emails, articles, video/audio transcriptions, a transcription of a phone conversation, and the like. The text 150 may include one or more lines of text. The text 150 may include sentences.

The base summarization algorithm 152 may be implemented by the processor 142 executing the software instructions 148 and is generally configured to generate a summary 154 from a piece of text 150. The base summarization algorithm 152 may comprise a support vector machine, neural network, random forest, k-means clustering, etc. The base summarization algorithm 152 may be implemented by a plurality of neural network (NN) layers, convolutional NN (CNN) layers, Long-Short-Term-Memory (LSTM) layers, Bi-directional LSTM layers, recurrent NN (RNN) layers, and the like. In some examples, the base summarization algorithm 152 may be implemented by natural language processing (NLP), data processing, text recognition, generative text processing, etc. In certain embodiments, the base summarization algorithm 152 may perform word segmentation, sentence segmentation, word tokenization, sentence tokenization, and sentiment analysis on a given text 150. The base summarization algorithm 152 may be implemented by unsupervised, semi-supervised, supervised learning. In some embodiments, the base summarization algorithm 152 may be pre-trained to generate summaries that may a mix of high-quality, medium-quality, and low-quality summaries.

The base summarization algorithm 152 may be pre-trained by a training dataset 156. The training dataset 156 may include a set of pieces of text 150, where each piece of text 150 is labeled with a respective summary 154. In the training stage, the base summarization algorithm 152 may be given a portion of the training dataset 156 and asked to learn the association and relationship between each pair of text 150 and its corresponding summary 154. In response, with respect to a first text 150 and a first summary 154, the base summarization algorithm 152 may extract a first set of features from the first text 150 and generate a first feature vector from the first set features for the first text 150. The first set of features may indicate context, contextual information, sentiment, tokenized words, tokenized sentences, a frequency of each word, and other linguistic characteristics of the first text 150. The base summarization algorithm 152 may perform a similar operation on the first summary 154, extract a second set of features from the first summary 154, and generate a second feature vector from the second set of features for the first summary 154. The second set of features may indicate key themes, context, contextual information, content, sentiment, meaning, tokenized words, tokenized sentence(s), a frequency of each word, and other linguistic characteristics of the first summary 154. The base summarization algorithm 152 may learn the associations between the first set of features and the second set of features and use this learning to generate summaries 154 for other text 150.

In the testing stage, the base summarization algorithm 152 is presented with a new text 150 that is not labeled with a summary. The objective is to evaluate the algorithm's ability to apply its learned associations and relationships to generate an accurate summary 154 for the new text 150. During the testing process, the base summarization algorithm 152 may divide the text 150 into a set of smaller portions, where each portion may include one or more words. The base summarization algorithm 152 may extract a first set of features from the new text 150, where the features indicate content, context, contextual information, word frequency of each word, sentence structure, tokenized words, and tokenized sentences, among other linguistics characteristics.

The base summarization algorithm 152 may access historical text-summary pairs from the training dataset 156 and use them to predict a summary for the new text 150. For example, the base summarization algorithm 152 may extract a second set of features from the historical text-summary pair, where the second set of features may include key themes, context, contextual information, content, sentiment, meaning, tokenized words, tokenized sentence(s), a frequency of each word, and other linguistic characteristics of each of the text and summary in the historical text-summary pair. The base summarization algorithm 152 may determine the correlations between the historical text and its summary. Based on the extracted first set and second set of features, the base summarization algorithm 152 may determine pertinent content and topics in the new text 150 for inclusion in a predicted summary 154.

The base summarization algorithm 152 may determine a sequence of words (or beam) to generate the summary 154 for the new text 150 based on the determined content and main topic of the text 150. The base summarization algorithm 152 may be fine-tuned in back-propagations where weights and biases of the neural network of the base summarization algorithm 152 are revised based on predetermined objectives to increase the accuracy of the generated summary 154. The base summarization algorithm 152 may perform similar operations for any given text 150 to generate a summary 154 of the text 150. In some embodiments, a summary 154 may be one or more lines of text.

In some embodiments, the base summarization algorithm 152 may be configured to generate summaries 154 with different summarization styles. For example, in a summarization style, the main topic is extracted from the text 150, and side topics of the text 150 may be ignored. In the same or another example, in a summarization style, a sentiment of the text 150 may be extracted and included in the summary 154. In the same or another example, a summarization style may include exact phrases, sentences, and/or words from the text 150. In the same or another example, a summarization style may include a narrative style. These examples are not meant to limit the scope of the present disclosure and other examples are possible and have been contemplated by the present disclosure.

The target summarization algorithm 158 may be implemented by the processor 142 executing the software instructions 148 and is generally configured to generate a summary for a piece of text 150. The target summarization algorithm 158 may comprise a support vector machine, neural network, random forest, k-means clustering, etc. The target summarization algorithm 158 may be implemented by a plurality of neural network layers, CNN layers, LSTM layers, Bi-directional LSTM layers, RNN layers, and the like. In some examples, the target summarization algorithm 158 may be implemented by NLP, data processing, text recognition, generative text processing, etc. In certain embodiments, the target summarization algorithm 158 may perform word segmentation, sentence segmentation, word tokenization, sentence tokenization, and sentiment analysis on a given text 150. The target summarization algorithm 158 may be implemented by unsupervised, semi-supervised, supervised learning. In some embodiments, the target summarization algorithm 158 may be trained by a training dataset 230 that includes the positive samples of summaries 154a-n that are determined to be positive samples of summaries for a given text 150, and the negative samples of summaries 154a-n that are determined to be positive samples of summaries for a given text 150.

Each composite metric 210a-d may be implemented by the processor 142 executing software instructions 148 and is generally configured to evaluate each summary 154a-n with respect to the text 150. In some embodiments, each composite metric 210a-d may be or include a summarization evaluation machine learning algorithm that is trained with a specific training dataset to determine whether a summary 154a-n is faithful and/or factual with respect to the text 150.

The composite metric 210a-d may comprise a support vector machine, neural network, random forest, k-means clustering, etc. The composite metric 210a-d may be implemented by a plurality of neural network layers, CNN layers, LSTM layers, Bi-directional LSTM layers, RNN layers, and the like. In some examples, the composite metric 210a-d may be implemented by NLP, data processing, text recognition, generative text processing, etc. In certain embodiments, the composite metric 210a-d may perform word segmentation, sentence segmentation, word tokenization, sentence tokenization, and sentiment analysis on a given text 150. The composite metric 210a-d may be implemented by unsupervised, semi-supervised, and/or supervised learning.

Operational Flow for Increasing the Accuracy of
the Summarization Process

FIG. 2 illustrates an example operational flow 200 of system 100 (see FIG. 1) for increasing the accuracy and quality (e.g., including truthfulness and faithfulness) of the summarization process. In operation, the operational flow 200 may begin when the user 102 sends a request (e.g., request 104 of FIG. 1) to the server 140 to summarize one or more pieces of text 150. In response, the server 140 may feed the text 150 to the base summarization algorithm 152 to generate a set of summaries 154a-n for the text 150, similar to that described in FIG. 1. For example, the base summarization algorithm 152 may predict the main topic of the text 150, determine a particular sequence of words to convey the main topic of the text 150, and output the determined sequence of words as the summary 154a. The base summarization algorithm 152 may determine other sequences of words to indicate the other types of summaries 154a-n.

In some embodiments, the generated summaries 154a-n may include a range of low-quality, medium-quality, and high-quality summaries. The server 140 is configured to evaluate each of the summaries 154a-n using the composite metrics 210 to identify the different level of qualities of the summaries 154a-n.

Labeling Each Summary Based on a Set of
Composite Metrics

The server 140 may determine a label 212 for each summary 154a-n based on the set of composite metrics 210a-d. In some embodiments, the label of a summary 154a-n may indicate a truthfulness and faithfulness of the summary 154a-n with respect to the text 150. In some examples, it may be determined that a summary 154a-n of the text 150 is truthful with respect to the text 150 if it is determined that the summary 154a-n comprises facts from the text 150. On the other hand, if a summary 154a-n includes incorrect information, it may be determined that the summary 154a-n is not factual/truthful with respect to the text 150.

In some examples, it may be determined that a summary 154a-n of the text 150 is faithful with respect to the text 150 if it is determined that the context of the summary 154a-n is consistent with the context of the text 150. For example, if the summary 154a-n includes irrelevant (even correct) information with respect to the text 150, the summary 154a-n may be unfaithful to the text 150. In a particular example, if a summary 154a-n includes the sentence "George Washington was the first president of the United State", but the text 150 does not include information about United States' first president, the summary 154a-n (even though is correct) may not be faithful to the text 150.

Each composite metric 210a-d may be configured with a knowledge base, such as a training dataset to determine a respective label 212 for a summary 154a-n. In some embodiments, the label 212 of a summary 154a-n may have binary classes, for example, a first label may be for summaries that are truthful and faithful to the text 150, and a second label may be for summaries that are not truthful and/or not faithful to the text 150. The composite metric 210a assigns a label 212a-1 to summary 154a, label 212n-1 to summary 154n, and appropriate labels to other summaries. The composite metric 210b assigns a label 212a-2 to summary 154a, label 212n-2 to summary 154n, and appropriate labels to other summaries. The composite metric 210c assigns a label 212a-3 to summary 154a, label 212n-3 to summary 154n, and appropriate labels to other summaries. The composite metric 210d assigns a label 212a-4 to summary 154a, label 212n-4 to summary 154n, and appropriate labels to other summaries. Although four composite metrics 210a-n are described and implemented, this is not meant to limit the scope of the present disclosure and the present disclosure contemplates any number of composite metrics to be used.

Each composite metric 210a-d is configured to evaluate one or more aspect of a summary 154 compared to the text 150. For example, the first composite metric 210a is configured to evaluate the factuality of the summary 154 and consistency between the summary 154 and the text 150.

For example, the first composite metric 210a may be or indicate a summary evaluation algorithm. The first composite metric 210a may be pre-trained with a specific dataset of summaries and corresponding labels. The first composite metric 210a may take a source document (e.g., text 150) and a claim sentence (e.g., a summary 154a) and is asked to check for factual consistency between the source document and the claim sentence. The first composite metric 210a may include a neural network including bidirectional encoder representation from transformers.

The first composite metric 210a is fine-tuned for the specific task of factual consistency checking. For example, the first composite metric 210a may extract a first set of features from the summary 154a, where the first set of features include keywords, word meaning, sentiment, tokenized words, tokenized sentences, context, contextual information, content, factual information, and other linguistic features of the summary 154a. The first composite metric 210a may perform a similar operation on the text 150 and extract a second set of features from the text 150, where the second set of features include keywords, word meaning, sentiment, tokenized words, tokenized sentences, context, contextual information, content, factual information, and other linguistic features of the text 150.

The first composite metric 210a may generate a first feature vector from the first set of features, and a second feature vector from the second set of features. The first composite metric 210a may compare the first feature vector with the second feature vector. If the first composite metric 210a determines that at least a part of the first feature vector is not similar (e.g., does not correspond) to the counterpart part of the second feature vector, the first composite metric 210a may determine that at least a part of the summary 154a is inconsistent with the text 150, i.e., determine a lack of factual consistency between the summary 154a and the text 150. For example, the composite metric 210a may determine a cosine similarity between the first and second feature vectors. If the cosine similarity is less than a threshold value (e.g., less than 0.5, 0.1, etc.), the composite metric 210a may determine that at least a part of the summary 154a is inconsistent with the text 150. In response, the composite metric 210a may assign a negative label 212a-1 to the summary 154a, where the negative label indicates that the summary 154a is not faithful and/or not truthful to the text 150. Otherwise, the first composite metric 210a may assign a positive label 212a-1 to the summary 154a, where the positive label indicates that the summary 154a is faithful and truthful to the text 150. The composite metric 210a may perform similar operations on other summaries 154a-n and assign a label to each summary 154a-n accordingly.

The second composite metric 210b is configured to determine whether a summary 154a-n includes factual information from the text 150. The second composite metric 210b may be trained with a dataset that includes text, where each text is labeled with a summary, and each summary is evaluated for its factual consistency with its corresponding text. The second composite metric 210b determines the dependency relationship among different words in each sentence in the summary, where the dependency relationship indicates the grammatical relationship between the words. The second composite metric 210b uses the dependency and relationship between the words of each sentence to determine whether they are factually supported by the original text 150. In this process, the second composite metric 210b may compare the summary 154a with the text 150 by feature extraction, feature vector generation and comparison, similar to that described above with respect to the first composite metric 210a. For example, with respect to summary 154a, the composite metric 210b determines a first feature vector associated with the summary 154a and a second feature vector associated with the text 150. The composite metric 210b may compare the first and second feature vectors, for example, by determining a cosine similarity between them. If it is determined that the cosine similarity is less than a threshold value (e.g., less than 0.5, 0.1, etc.), the composite metric 210b may determine that the summary 154a the summary 154a includes information that are factually supported by the original text 150, the second composite metric 210b may assign a positive label 212a-2 to the summary 154a, where the positive label indicates that the summary 154a is faithful and truthful to the text 150. Otherwise, the second composite metric 210b may assign a negative label 212a-2 to the summary 154a, where the negative label indicates that the summary 154a is not faithful and/or not truthful to the text 150. The composite metric 210b may perform similar operations on other summaries 154a-n and assign a label to each summary 154a-n accordingly. Other composite metrics 210c and 210d may be configured to evaluate the summaries 154a-n in various ways.

The server 140 determines the labels 212a-1, 212a-2, 212a-3, and 212a-4 assigned to the summary 154a by the composite metrics 210a, 210b, 210c, and 210d, respectively. Similarly, the server 140 determine the labels 212n-1, 212n-2, 212n-3, and 212n-4 assigned to the summary 154n by the composite metrics 210a, 210b, 210c, and 210d, respectively.

In some embodiments, each label 212 (e.g., labels 212a-1, 212a-2, 212a-3, 212a-4, 212n-1, 212n-2, 212n-3, and 212n-4) may be a binary indication of whether or not a summary 154a-n is truthful and faithful to the text 150. For example, if a summary 154a-n is labeled with a positive label 212 (e.g., a label with a term "positive"), it may be indicative that the summary 154a-n is truthful and faithful to the text 150. If the summary 154a-n is labeled with a negative label 212 (e.g., a label with a term "negative"), it may be indicative that the summary 154a-n is not truthful and/or not faithful to the text 150. In such embodiments, the server 140 may use the majority polling of the composite metrics 210a-d to identify one or more summaries 214a that are assigned with positive labels 212. For example, if more than the threshold number 220 of the composite metrics 210a-d indicate that a summary 154a-n is assigned with a positive label 212, the server 140 may determine that the summary 154a-n is truthful and faithful to the text 150.

The server 140 may rank the summaries 154a-n in terms of their labels 212 and in a descending order of a number of composite metrics 210a-d that have assigned positive labels 212 to the summaries 154a-n to identify the top percentage 216 of the summaries 154a-n that are assigned with positive labels 212 by a more than the threshold number 220 of the composite metrics 210a-d. The server 140 may store this subset of summaries 154a-n as summaries 214a.

In some embodiments, the server 140 may use the top percentage 216 of the summaries 154a-n as the positive summaries 214a, use the bottom percentage 218 of the summaries 154a-n as the negative summaries 214b, and exclude the rest of the summaries 154a-n from being included in the dataset 230. Therefore, the dataset 230 includes a more focused set of positive samples of summaries and a more focused set of negative samples of summaries to be used for training summarization algorithms, such as the target summarization algorithm 158, instead of using all of the summaries 154a-n and using a range of levels of using a broader, less focused set of summaries. This selective approach improves the quality of the training dataset 230, and filters out summaries that are not identified to be positive or negative samples by more than the threshold number of composite metrics 210a-d. Thus, the training process of the target summarization algorithm 158 becomes more efficient and effective because the number of data points (e.g., summaries as positive and negative samples) is reduced while providing a more focused set of positive and negative examples. This reduces the computational complexity of the training and summarization process of the target summarization algorithm 158, and therefore, the processing and memory resources utilized for the training and summarization process are reduced.

Further, in such embodiments where a binary label (e.g., positive or negative) is assigned to each summary 154a-n, if more than the threshold number 220 of the composite metrics 210a-d indicate that a summary 154a-n is assigned with a negative label 212, the server 140 may determine that the summary 154a-n is not truthful and/or not faithful to the text 150. The server 140 may use the ranking of the summaries 154a-n in terms of their labels 212 and in the descending order of a number of composite metrics 210a-d that have assigned positive labels 212 to the summaries 154a-n to identify the bottom percentage of 218 of summaries 154a-n that are assigned with negative labels 212 by a more than the threshold number 220 of the composite metrics 210a-d. The server 140 may store this subset of summaries 154a-n as summaries 214b.

In some embodiments, each label 212 (e.g., labels 212a-1, 212a-2, 212a-3, 212a-4, 212n-1, 212n-2, 212n-3, and 212n-4) may be in a scale, e.g., of one to ten and may indicate a level of truthfulness and faithfulness of a summary 154a-n with respect to the text 150. For example, a score assigned to a summary 154a-n by a composite metric 210a-d may be proportional to the confidence of a composite metric 210a-d with respect to the truthfulness and faithfulness of the summary 154a-n with respect to the text 150.

In such embodiments, the server 140 may accumulate the scores indicated by the labels 212 of each summary 154a-n to evaluate the summary 154a-n. For example, with respect to the first summary 154a, the server 140 may accumulate the scores indicated by the labels 212a-1, 212a-2, 212a-3, and 212a-4, and determine the accumulated score (i.e., accumulation of scores indicated by the labels 212a-1, 212a-2, 212a-3, and 212a-4). In response, the server 140 may determine whether more than a threshold number 220 of the composite metrics 210a-d have of the composite metrics 210a-d assigned a high score or a low score to the first summary 154a. For example, the server 140 may rank the summaries 154a-n in an descending order of scores indicated by the labels 212. If it is determined that the accumulated score is more than the threshold score (e.g., more than 70%, 80%, etc.) and that more than a threshold number 220 of the composite metrics 210a-d have assigned a score more than a threshold score (e.g., more than 70%, 80%, etc.) to the first summary 154a, the server 140 may determine that the first summary 154a is truthful and faithful to the text 150.

In some examples, the server 140 may determine that the summary 154a is assigned with the accumulated score 212a that is more than the threshold score based on determining that more than the threshold number 220 of the composite metrics 210a-d indicate that summary 154a is assigned with the accumulated score that is more than the threshold score. In this manner, the server 140 may add the summary 154a to the summaries 214a.

The server 140 may determine and evaluate the accumulated score of each summary 154a-n and add one or more other summaries 154 to the summaries 214a, similar to that described above. For example, for the summary 154n, the server 140 may accumulate the scores indicated by the labels 212n-1, 212n-2, 212n-3, and 212n-4, and determine the accumulated score (i.e., accumulation of scores indicated by the labels 212n-1, 212n-2, 212n-3, and 212n-4). In response, the server 140 may determine whether more than the threshold number 220 of the composite metrics 210a-d have assigned a high score or low score to the summary 154n. If it is determined that the accumulated score is less than the threshold score (e.g., less than 40%, 30%, etc.) and that more than a threshold number 220 of the composite metrics 210a-d have assigned a score less than a threshold score (e.g., less than 40%, 30%, etc.) to the summary 154n, the server 140 may determine that the summary 154n is not truthful and/or not faithful to the text 150.

In some examples, the server 140 may determine that the summary 154n is assigned with an accumulated score that is less than the threshold score based on determining that more than the threshold number 220 of the composite metrics 210a-d indicate that summary 154n is assigned with the accumulated score that is less than the threshold score. In this manner, the server 140 may add the summary 154n to the summaries 214b.

The server 140 may determine and evaluate the accumulated score of each summary 154a-n and add one or more other summaries 154 to the summaries 214b, similar to that described above. The server 140 may add the summaries 214a as positive samples 232 of summaries for the text 150 to the dataset 230 of text-summary pairs. For example, the server 140 may add the summary 154a paired with the text 150 as one of the text-summary pairs 236 that are labeled as positive samples 232 to the dataset 230. Similarly, the server 140 may add the summaries 214n as negative samples 234 of summaries for the text 150 to the dataset 230. For example, the server 140 may add the summary 154n paired with the text 150 as one of the text-summary pairs 238 that are labeled as negative samples 234 to the dataset 230. In this way, by adding the positive and negative samples, the dataset 230 may be populated. The server 140 may perform similar operations on other summaries 154*a-n* and other text 150, and populate the dataset 230 with different pairs of text and summaries and label than as positive samples 232 or negative samples 234 accordingly.

The server 140 may use the generated dataset 230 to train the target summarization algorithm 158. In operation of the target summarization algorithm 158, assume that the server 140 receives a text 150 and a request 104 to generate a summary for the text 150. In response, the server 140 may input the received text 150 to the target summarization algorithm 158. The target summarization algorithm 158 may use the dataset 230 as a training dataset to generate and predict a summary 154 for the text 150 that provides the context of the text 150 and is truthful and faithful to the text 150. The target summarization algorithm 158, utilizing the dataset 230, analyzes the received text 150 by applying natural language processing techniques to extract a set of features, including context, contextual information, content, sentiment, meaning, tokenized words, tokenized sentence (s), a frequency of each word, and other linguistic characteristics of the text 150. The target summarization algorithm 158 may extract features from each text-summary pair 236 to determine the relationship between the text and corresponding summary in the positive samples of text-summary pairs 236. The target summarization algorithm 158 may extract features from each text-summary pair 238 to determine the relationship between the text and corresponding summary in the negative samples of text-summary pairs 238. Based on the features extracted from the text 150 and each text-summary pair 236, 238, the target summarization algorithm 158 may use the learned relationship between the text and corresponding summary in the positive samples of text-summary pairs 236 to generate a summary for the text 150 that is accurate, faithful, and truthful to the text 150, while using the learned relationship between the text and corresponding summary in the negative samples of text-summary pairs 238 to avoid generating a summary that follows the negative summaries. In this process, the target summarization algorithm 158 may predict the summary by determining a sequence of words that is factually aligned with the text 150 and is faithful to the information indicated in the text 150.

Example Method for Generating Controllable Output Summary for Text

FIG. 3 illustrates an example flowchart of a method 300 for generating a controllable output summary for text 150, according to some embodiments. Modifications, additions, or omissions may be made to method 300. Method 300 may include more, fewer, or other operations. For example, operations may be performed in parallel or in any suitable order. While at times it is discussed that the system 100, computing devices 120, server 140, or components of any of thereof perform some operations, any suitable system or components of the system may perform one or more operations of the method 300. For example, one or more operations of method 300 may be implemented, at least in part, in the form of software instructions 148 of FIG. 1, stored on a tangible non-transitory machine-readable medium (e.g., memory 146 of FIG. 1) that when run by one or more processors (e.g., processor 142 of FIG. 1) may cause the one or more processors to perform operations 302-324.

At operation 302, the server 140 generates a set of summaries 154*a-n* of the text 150. For example, the server

140 may implement the base summarization algorithm 152 to generate the set of summaries 154*a-n*, similar to that described in FIG. 2.

At operation 304, the server 140 selects a summary 154*a-n* from among the set of summaries 154*a-n*. The server 140 may iteratively select a summary 154*a-n* until no summary 154*a-n* is left for evaluation.

At operation 306, the server 140 determines a label 212 for the summary 154*a-n* based on a set of composite metrics 210*a-d*, similar to that described in FIG. 2. At operation 308, the server 140 determines whether more than a threshold number 220 of composite metrics 210*a-d* indicate that the summary 154*a-n* is assigned with a positive label 212. If it is determined that more than the threshold number 220 of the composite metrics 210*a-d* indicate that the summary 154*a-n* is assigned with a positive label 212, the method 300 may proceed to operation 310. Otherwise, the method 300 may proceed to operation 312.

At operation 310, the server 140 determines that the summary 154*a-n* is a positive sample for the text 150. At operation 312, the server 140 determines that the summary 154*a-n* is a negative sample for the text 150. At operation 314, the server 140 determines whether to select another summary 154*a-n*. The server 140 determines to select another summary 154*a-n* if at least one summary 154*a-n* is left for evaluation. If it is determined to select another summary 154*a-n*, the method 300 returns to operation 304. Otherwise, the method 300 proceeds to operation 316.

At operation 316, the server 140 identifies a top threshold percentage 216 of summaries 154*a-n* indicated as positive samples for the text 150. For example, the server 140 may identify the top 10%, 20%, etc. of the summaries 214*a*, similar to that described in FIG. 2. At operation 318, the server 140 adds the identified summaries 214*a* to the dataset 230.

At operation 320, the server 140 identifies the bottom threshold percentage 218 of summaries 154*a-n* indicated as negative samples for the text 150. For example, the server 140 may identify the bottom 10%, 20%, etc. of the summaries 214*b*, similar to that described in FIG. 2. At operation 322, the server 140 adds the identified negative summaries 214*b* to the dataset 230. At operation 324, the server 140 trains the target summarization algorithm 158 with the dataset 230.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system for increasing accuracy in summarization techniques, comprising:

a memory configured to store a file comprising a first text, wherein the first text comprises one or more lines of text; and a processor, operably coupled to the memory, and configured to:

generate, by a base summarization algorithm, a set of summaries for the first text, wherein each summary from the set of summaries is associated with a respective summarization style;

determine a label of each summary from the set of summaries based at least in part upon a set of composite metrics, wherein the label of a summary indicates a truthfulness and faithfulness of the summary with respect to the first text, wherein:

it is determined that the summary of the first text is truthful with respect to the first text in response to determining that the summary comprises facts from the first text;

it is determined that the summary of the first text is faithful with respect to the first text in response to determining that context of the summary is consistent with context of the first text;

determining, by the base summarization algorithm, the label of each summary from the set of summaries based at least in part upon the set of composite metrics comprises:

determining, based at least in part upon a first composite metric from among the set of composite metrics, a first label for a first summary from among the set of summaries, wherein:

the first composite metric indicates a factual consistency between the first summary and the first text, and the first label indicates that the first summary is truthful and faithful with respect to the first text based at least in part upon a similarity indication between the first summary and the first text exceeding a threshold;

determining, based at least in part upon the first composite metric, a second label for a second summary from among the set of summaries, wherein the second label indicates that the second summary is not truthful or not faithful with respect to the first text;

determining, based at least in part upon a second composite metric from among the set of composite metrics, the first label for the first summary, wherein the second composite metric indicates that a dependency relationship among words in the first summary is factually supported by the first text; and determining, based at least in part upon the second composite metric, the second label for the second summary;

determine that more than a threshold number of the set of composite metrics indicate that at least the first summary is assigned with the first label, wherein the first label indicates that the first summary is truthful and faithful with respect to the first text;

determine that more than the threshold number of the set of composite metrics indicate that the second summary is assigned with the second label, wherein the second label indicates that the second summary is not truthful and/or not faithful with respect to the first text;

create a dataset of text-summary pairs comprising the first summary paired with the first text and the second summary paired with the first text, wherein;

the first summary is labeled as a positive sample for the first text; and the second summary is labeled as a negative sample for the first text; and train, using a contrastive learning method, a target summarization algorithm with the dataset, wherein the trained target summarization algorithm is configured to generate a summary of a future text according to a first set of summaries with the positive sample while avoiding a second set of summaries with the negative sample.

2. The system of claim 1, wherein generating the set of summaries for the first text comprises generating the first summary for the first text, comprising:

dividing the first text into a set of portions, wherein each portion comprises at least one word;

extracting a first set of features from the first text, wherein the extracted set of features indicates context of the first text and a frequency of each word of the first text;

accessing a historical text-summary pair;

extracting a second set of features from the historical text-summary pair, wherein the second set of features comprises key elements and contextual information present in the historical text-summary pair;

based at least in part upon the extracted second set of features, determining correlations between the historical text and a corresponding summary;

based at least in part upon the extracted first set of features and the second set of features, determining pertinent content in the first text for inclusion in the first summary; and outputting the first summary.

3. The system of claim 1, wherein the respective style of summarization comprises:

a first style in which a main topic is extracted from the first text and side topics of the first text are ignored; or a second style in which a sentiment of the first text is extracted and included in a summary.

4. The system of claim 1, wherein the processor is further configured to:

receive a second text;

input the received second text to the target summarization algorithm; and predict a third summary for the second text, wherein the third summary indicates context of the second text.

5. The system of claim 1, wherein:

determining the label of each summary from the set of summaries based at least in part upon the set of composite metrics further comprises determine, based at least in part upon a third composite metric from among the set of composite metrics, the first label for the first summary; and determining that more than the threshold number of the set of composite metrics indicate that at least the first summary is assigned with the first label is based at least in part upon determining that the first composite metric, the second composite metric, and the third composite metric have assigned the first label for the first summary.

6. The system of claim 1, wherein determining the label of each summary from the set of summaries based at least in part upon the set of composite metrics further comprises determining, based at least in part upon a third composite metric, the second label for the second summary.

7. The system of claim 6, wherein determining that more than the threshold number of the set of composite metrics indicate that at least the second summary is assigned with the second label is based at least in part upon determining that the first composite metric, the second composite metric, and the third composite metric have assigned the second label for the second summary.

8. A method for increasing accuracy in summarization techniques, comprising:

storing a file comprising a first text, wherein the first text comprises one or more lines of text; and generating, by a base summarization algorithm, a set of summaries for the first text, wherein each summary from the set of summaries is associated with a respective summarization style;

determining, by the base summarization algorithm, a label of each summary from the set of summaries based at least in part upon a set of composite metrics, wherein the label of a summary indicates a truthfulness and faithfulness of the summary with respect to the first text, wherein:

it is determined that the summary of the first text is truthful with respect to the first text in response to determining that the summary comprises facts from the first text;

it is determined that the summary of the first text is faithful with respect to the first text in response to determining that context of the summary is consistent with context of the first text;

determining the label of each summary from the set of summaries based at least in part upon the set of composite metrics comprises:

determining, based at least in part upon a first composite metric from among the set of composite metrics, a first label for a first summary from among the set of summaries, wherein:

the first composite metric indicates a factual consistency between the first summary and the first text, and the first label indicates that the first summary is truthful and faithful with respect to the first text based at least in part upon a similarity indication between the first summary and the first text exceeding a threshold;

determining, based at least in part upon the first composite metric, a second label for a second summary from among the set of summaries, wherein the second label indicates that the second summary is not truthful or not faithful with respect to the first text;

determining, based at least in part upon a second composite metric from among the set of composite metrics, the first label for the first summary, wherein the second composite metric indicates that a dependency relationship among words in the first summary is factually supported by the first text; and determining, based at least in part upon the second composite metric, the second label for the second summary;

determining that more than a threshold number of the set of composite metrics indicate that at least the first summary is assigned with the first label, wherein the first label indicates that the first summary is truthful and faithful with respect to the first text;

determining that more than the threshold number of the set of composite metrics indicate that the second summary is assigned with the second label, wherein the second label indicates that the second summary is not truthful and/or not faithful with respect to the first text;

creating a dataset of text-summary pairs comprising the first summary paired with the first text and the second summary paired with the first text, wherein:

the first summary is labeled as a positive sample for the first text; and the second summary is labeled as a negative sample for the first text; and training, using a contrastive learning method, a target summarization algorithm with the dataset, wherein the trained target summarization algorithm is configured to generate a summary of a future text according to a first set of summaries with the positive sample while avoiding a second set of summaries with the negative sample.

9. The method of claim 8, wherein generating the set of summaries for the first text comprises generating the first summary for the first text, comprising:

dividing the first text into a set of portions, wherein each portion comprises at least one word;

extracting a first set of features from the first text, wherein the extracted set of features indicates context of the first text and a frequency of each word of the first text;

accessing a historical text-summary pair;

extracting a second set of features from the historical text-summary pair, wherein the second set of features comprises key elements and contextual information present in the historical text-summary pair;

based at least in part upon the extracted second set of features, determining correlations between the historical text and a corresponding summary;

based at least in part upon the extracted first set of features and the second set of features, determining pertinent content in the first text for inclusion in the first summary; and outputting the first summary.

10. The method of claim 8, wherein the respective style of summarization comprises:

a first style in which a main topic is extracted from the first text and side topics of the first text are ignored; or a second style in which a sentiment of the first text is extracted and included in a summary.

11. The method of claim 8, further comprises:

receiving a second text;

inputting the received second text to the target summarization algorithm; and predicting a third summary for the second text, wherein the third summary indicates context of the second text.

12. The method of claim 8, wherein:

determining the label of each summary from the set of summaries based at least in part upon the set of composite metrics further comprises determining, based at least in part upon a third composite metric from among the set of composite metrics, the first label for the first summary; and determining that more than the threshold number of the set of composite metrics indicate that at least the first summary is assigned with the first label is based at least in part upon determining that the first composite metric, the second composite metric, and the third composite metric have assigned the first label for the first summary.

13. The method of claim 8, wherein determining the label of each summary from the set of summaries based at least in part upon the set of composite metrics further comprises determining, based at least in part upon a third composite metric, the second label for the second summary.

14. The method of claim 13, wherein determining that more than the threshold number of the set of composite metrics indicate that at least the second summary is assigned with the second label is based at least in part upon determining that the first composite metric, the second composite metric, and the third composite metric have assigned the second label for the second summary.

15. A non-transitory computer-readable medium storing instructions that, when executed by a processor, cause the processor to:

store a file comprising a first text, wherein the first text comprises one or more lines of text;

generate, by a base summarization algorithm, a set of summaries for the first text, wherein each summary from the set of summaries is associated with a respective summarization style;

determine, by the base summarization algorithm, a label of each summary from the set of summaries based at least in part upon a set of composite metrics, wherein the label of a summary indicates a truthfulness and faithfulness of the summary with respect to the first text, wherein:

it is determined that the summary of the first text is truthful with respect to the first text in response to determining that the summary comprises facts from the first text;

it is determined that the summary of the first text is faithful with respect to the first text in response to determining that context of the summary is consistent with context of the first text;

determining the label of each summary from the set of summaries based at least in part upon the set of composite metrics comprises:

determining, based at least in part upon a first composite metric from among the set of composite metrics, a first label for a first summary from among the set of summaries, wherein:

the first composite metric indicates a factual consistency between the first summary and the first text, and the first label indicates that the first summary is truthful and faithful with respect to the first text based at least in part upon a similarity indication between the first summary and the first text exceeding a threshold;

determining, based at least in part upon the first composite metric, a second label for a second summary from among the set of summaries, wherein the second label indicates that the second summary is not truthful or not faithful with respect to the first text;

determining, based at least in part upon a second composite metric from among the set of composite metrics, the first label for the first summary, wherein the second composite metric indicates that a dependency relationship among words in the first summary is factually supported by the first text; and determining, based at least in part upon the second composite metric, the second label for the second summary;

determine that more than a threshold number of the set of composite metrics indicate that at least the first summary is assigned with the first label, wherein the first label indicates that the first summary is truthful and faithful with respect to the first text;

determine that more than the threshold number of the set of composite metrics indicate that the second summary is assigned with the second label, wherein the second label indicates that the second summary is not truthful and/or not faithful with respect to the first text;

create a dataset of text-summary pairs comprising the first summary paired with the first text and the second summary paired with the first text, wherein;

the first summary is labeled as a positive sample for the first text; and the second summary is labeled as a negative sample for the first text; and train, using a contrastive learning method, a target summarization algorithm with the dataset, wherein the trained target summarization algorithm is configured to generate a summary of a future text according to a first set of summaries with the positive sample while avoiding a second set of summaries with the negative sample.

16. The non-transitory computer-readable medium of claim 15, wherein generating the set of summaries for the first text comprises generating the first summary for the first text, comprising:

dividing the first text into a set of portions, wherein each portion comprises at least one word;

extracting a first set of features from the first text, wherein the extracted set of features indicates context of the first text and a frequency of each word of the first text;

accessing a historical text-summary pair;

extracting a second set of features from the historical text-summary pair, wherein the second set of features comprises key elements and contextual information present in the historical text-summary pair;

based at least in part upon the extracted second set of features, determining correlations between the historical text and a corresponding summary;

based at least in part upon the extracted first set of features and the second set of features, determining pertinent content in the first text for inclusion in the first summary; and outputting the first summary.

17. The non-transitory computer-readable medium of claim 15, wherein the respective style of summarization comprises:

a first style in which a main topic is extracted from the first text and side topics of the first text are ignored; or a second style in which a sentiment of the first text is extracted and included in a summary.

18. The non-transitory computer-readable medium of claim 15, wherein the instructions further cause the processor to:

receive a second text;

input the received second text to the target summarization algorithm; and predict a third summary for the second text, wherein the third summary indicates context of the second text.

19. The non-transitory computer-readable medium of claim 15, wherein:

determining the label of each summary from the set of summaries based at least in part upon the set of composite metrics further comprises determining, based at least in part upon a third composite metric from among the set of composite metrics, the first label for the first summary; and determining that more than the threshold number of the set of composite metrics indicate that at least the first summary is assigned with the first label is based at least in part upon determining that the first composite metric, the second composite metric, and the third composite metric have assigned the first label for the first summary.

20. The non-transitory computer-readable medium of claim 15, wherein:

determining the label of each summary from the set of summaries based at least in part upon the set of composite metrics further comprises determining, based at least in part upon a third composite metric, the second label for the second summary; and determining that more than the threshold number of the set of composite metrics indicate that at least the second summary is assigned with the second label is based at least in part upon determining that the first composite metric, the second composite metric, and the third composite metric have assigned the second label for the second summary.

\* \* \* \* \*